(12) United States Patent
Okada et al.

(10) Patent No.: US 7,354,520 B2
(45) Date of Patent: *Apr. 8, 2008

(54) METHOD OF MANUFACTURING OPTICAL ELEMENT

(75) Inventors: Takeshi Okada, Kanagawa (JP); Katsuhiko Takano, Kanagawa (JP); Junichi Sakamoto, Kanagawa (JP); Shoji Shiba, Kanagawa (JP); Kenichi Iwata, Tokyo (JP); Hiroshi Taniuchi, Kanagawa (JP); Takehito Nishida, Tokyo (JP); Yoshikatsu Okada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 292 days.

This patent is subject to a terminal disclaimer.

(21) Appl. No.: 10/633,523

(22) Filed: Aug. 5, 2003

(65) Prior Publication Data
US 2004/0058063 A1    Mar. 25, 2004

Related U.S. Application Data

(62) Division of application No. 09/867,492, filed on May 31, 2001, now Pat. No. 6,677,243.

(30) Foreign Application Priority Data
Jun. 2, 2000 (JP) .............................. 2000-165584
Oct. 22, 2000 (JP) .............................. 2000-311411

(51) Int. Cl.
*B44C 1/22* (2006.01)
*C25F 3/00* (2006.01)

(52) U.S. Cl. .............................. 216/11; 216/4; 216/24; 216/39; 216/67

(58) Field of Classification Search ...................... None
See application file for complete search history.

(56) References Cited

U.S. PATENT DOCUMENTS 4,356,429 A    10/1982    Tang .......................... 313/503

(Continued)

FOREIGN PATENT DOCUMENTS

CN    1176393 A    3/1998

(Continued)

OTHER PUBLICATIONS

The Chemical Society of Japan, (10), 1985, pp. 1916-1923.

(Continued)

*Primary Examiner*—Allan Olsen
(74) *Attorney, Agent, or Firm*—Fitzpatrick, Cella, Harper & Scinto

(57) ABSTRACT

An optical element comprising at least a plurality of pixels formed on a substrate and partition walls arranged respectively between adjacent pixels is manufactured by a method comprising steps of forming partition walls of a resin composition on a substrate, performing a dry etching process by irradiating the substrate carrying the partition walls formed thereon with plasma in an atmosphere containing gas selected from oxygen, argon and helium, performing a plasma treatment process by irradiating the substrate subjected to the dry etching process with plasma in an atmosphere containing at least fluorine atoms, and forming pixels by applying ink to the areas surrounded partition walls by means of an ink-jet system.

3 Claims, 7 Drawing Sheets

U.S. PATENT DOCUMENTS

| | | | | |
|---|---|---|---|---|
| 4,539,507 A | | 9/1985 | VanSlyke et al. | 313/504 |
| 5,015,856 A | * | 5/1991 | Gold | 250/339.03 |
| 5,470,760 A | * | 11/1995 | Nakai | 438/69 |
| 5,708,486 A | | 1/1998 | Miyawaki et al. | 341/44 |
| 5,712,064 A | | 1/1998 | Miyazaki et al. | 430/7 |
| 5,716,740 A | | 2/1998 | Shiba et al. | 430/7 |
| 5,726,724 A | | 3/1998 | Shirota et al. | 349/106 |
| 5,817,441 A | | 10/1998 | Iwata et al. | 430/7 |
| 5,838,409 A | | 11/1998 | Tomono et al. | 349/122 |
| 5,888,679 A | | 3/1999 | Suzuki et al. | 430/7 |
| 5,891,014 A | | 4/1999 | Akiba | 600/158 |
| 5,922,401 A | | 7/1999 | Kashiwazaki et al. | 427/164 |
| 5,948,576 A | | 9/1999 | Shirota et al. | 430/7 |
| 6,042,974 A | | 3/2000 | Iwata et al. | 430/7 |
| 6,094,247 A | | 7/2000 | Miyazaki et al. | 349/110 |
| 6,127,072 A | | 10/2000 | Shiba et al. | 430/7 |
| 6,183,917 B1 | | 2/2001 | Sakamoto et al. | 430/7 |
| 6,195,147 B1 | | 2/2001 | Asao et al. | 349/133 |
| 6,476,988 B1 | | 11/2002 | Yudasaka | 359/885 |
| 6,630,274 B1 | * | 10/2003 | Kiguchi et al. | 430/7 |
| 6,677,243 B2 | * | 1/2004 | Okada et al. | 438/706 |
| 2002/0187312 A1 | * | 12/2002 | Fonash et al. | 428/195 |
| 2004/0201048 A1 | * | 10/2004 | Seki et al. | 257/294 |

FOREIGN PATENT DOCUMENTS

| | | |
|---|---|---|
| EP | 0 823 644 | 2/1998 |
| EP | 0 989 778 A1 | 3/2000 |
| EP | 0 993 235 | 4/2000 |
| EP | 1 061 383 | 12/2000 |
| JP | 57-51781 | 3/1982 |
| JP | 59-75205 | 4/1984 |
| JP | 59-194393 | 11/1984 |
| JP | 4-123005 | 4/1992 |
| JP | 5-241011 | 9/1993 |
| JP | 5-241012 | 9/1993 |
| JP | 9-230129 | 9/1997 |
| JP | 10-288707 | 10/1998 |
| JP | 11-32974 | 2/1999 |
| JP | 11-271753 | 10/1999 |
| JP | 2000-18771 | 1/2000 |
| JP | 2000-35511 | 2/2000 |

OTHER PUBLICATIONS

Apr. 27, 2007 Chinese Official Action in Chinese Patent Appln. No. 200510006816.6 (with English-language translation).

* cited by examiner

METHOD OF MANUFACTURING OPTICAL ELEMENT

This application is a division of application Ser. No. 09/867,492 filed May 31, 2001, U.S. Pat. No. 6,677,243 B2.

BACKGROUND OF THE INVENTION

1. Field of the Invention

This invention relates to a method of manufacturing an optical element such as a color filter for operating as a component of a color liquid crystal device to be used typically for a color television, a personal computer, etc. or an electroluminescence element having a plurality of light-emitting layers for full color display by utilizing an ink-jet system.

2. Related Background Art

The demand for liquid crystal displays, color liquid crystal displays in particular, has been increasing in recent years, keeping pace with the technological advancement in the field of personal computers including portable personal computers. However, to further boost the demand, the cost of color liquid crystal displays must be reduced further particularly in terms of the color filters they comprise, because the color filters account for a significant portion of the overall manufacturing cost.

While various techniques have been proposed to date in an attempt to meet the above requirement and also the requirements for improving color filter performance, no satisfactory solution has been found so far. Known methods for preparing color filters will be summarily discussed below.

First, there is a dyeing method. With a dyeing method, a layer of a water-soluble polymer material is formed as a dyeing layer on a transparent substrate and subjected to a patterning operation using photolithography to produce a desired pattern, which is then immersed in a dyeing bath to obtain a colored pattern. The above sequence of operation is repeated three times to produce a colored layer comprising differently colored sections of three colors of R (red), G (green) and B (blue).

Second, there is a pigment dispersion method, for which massive research efforts have been paid in recent years. With a pigment dispersion method, a photosensitive resin layer containing a pigment in a dispersed state is formed on a transparent substrate and then subjected to a patterning operation to obtain a single color pattern. The above sequence of operation is repeated three times to produce a colored layer comprising differently colored sections of R, G and B.

Third, there is an electrodeposition method. With this method, a transparent electrode formed on a transparent substrate is patterned and immersed in an electrodeposition painting solution containing a pigment, resin and electrolytic liquid to electrodeposit a first color. This process is repeated three times to produce a colored layer comprising differently colored sections of R, G and B, which is then baked.

With a fourth method, a pigment is dispersed in thermo-setting-type resin and printed. This process is repeated three times using three different colors of R, G and B, and subsequently the resin is thermally set to produce a colored layer. With any of the above described methods, a protection layer is normally formed on the colored layer.

What is common to all the above-described methods is that a process must be repeated three times for R, G and B, consequently raising the cost. Additionally, any methods involving a large number of steps entail a problematic low yield. Furthermore, in the case of an electrodeposition method, the profile of the pattern that can be formed by electrodeposition is quite limited, and hence the method is hardly applicable to the process of forming a liquid crystal element of the TFT type (to be used with an active matrix drive method using a TFT (thin film transistor) as switching element).

A printing method is accompanied by a problem of poor resolution and hence hardly applicable to the formation of a pattern having a fine pitch.

As an attempt to avoid the above-identified problems, efforts have been made to develop a method of manufacturing color filters that utilizes an ink-jet system. A manufacturing method using an ink-jet system provides an advantage of a simple manufacturing process and low manufacturing cost.

Additionally, an ink-jet system is applicable to manufacturing not only color filters but also electroluminescence elements.

An electroluminescence element comprises a thin film containing a fluorescent organic or inorganic compound that is sandwiched by a cathode and an anode and is adapted to generate excitons when electrons or holes are injected into the thin film for recombination, so that it can be made to emit light by means of the emission of fluorescence or phosphorescence that occurs when the excitons are deactivated. Thus, an electroluminescence element can be formed by applying a fluorescent material to be used for the electroluminescence element onto a substrate carrying TFT elements formed therein to produce a light-emitting layer there.

The ink-jet system finds applications in the manufacture of optical elements including color filters and electroluminescence elements, because it provides an advantage of a simple manufacturing process and low manufacturing cost as pointed out above. However, the manufacture of optical elements using the ink-jet system is accompanied by problems such as "intermingling of colors" and "blank areas" that are specific to the ink-jet system. These problems will be discussed below in terms of manufacturing color filters.

The problem of "intermingling of colors" arises when inks of different colors are intermingled between any two adjacent pixels (colored sections) showing different colors. With a method of manufacturing color filters, using a black matrix of an appropriate material as partition walls and forming colored sections by applying inks to the respective openings of the black matrix, inks need to be applied by a volume several times to tens of several times greater than the capacity of the openings. If the inks contain solid ingredients such as a coloring agent and a hardening component to a high concentration and hence the volume of inks to be applied is relatively small, the black matrix operates satisfactorily as partition walls and can sufficiently retain inks in the openings so that any applied ink would not flow over the black matrix to reach an adjacent colored section showing a color different from that of the ink. However, on the other hand, if the inks contain solid ingredients only to a low concentration and hence a large volume of ink has to be applied, the applied ink would flow over the black matrix and become intermingled with the other inks in adjacently located colored sections. Particularly, since there is a limit to the viscosity of ink that can be ejected stably from the nozzle of an ink-jet head and also to the concentration of the solid ingredients contained in the inks, a special and cumbersome technique is required to avoid the problem of intermingling of colors.

There have been proposed techniques for preventing intermingling of colors by utilizing the wettability of ink between the colored sections and the partition walls. For instance, Japanese Patent Application Laid-Open No. 59-75205 describes a method of forming an anti-diffusion pattern, using a poorly wettable material, in order to prevent ink from flowing into areas other than target areas. However, the above patent document does not specifically teach how to form such a pattern. On the other hand, Japanese Patent Application Laid-Open No. 4-123005 describes a method of forming partition walls for preventing intermingling of different colors by patterning a silicone rubber layer that is highly water-repellent and oil-repellent. Additionally, Japanese Patent Application Laid-Open No. 5-241011 and Japanese Patent Application Laid-Open No. 5-241012 also disclose methods of forming a silicon rubber layer on a black matrix operating as a light-shielding layer so that it can be used as partition walls for the purpose of preventing intermingling of colors.

With any of the above methods, the ink applied to such an extent that it exceeds by far the height of the partition walls is repelled by the ink-repellent surface layer of the partition walls so that the ink does not flow over the partition walls into any adjacent colored sections, and the intermingling of colors can be effectively prevented.

FIGS. 3A and 3B of the accompanying drawings schematically and conceptually illustrate the problem of intermingling of colors that arises with known methods of manufacturing an optical element. Referring to FIGS. 3A and 3B, a black matrix 33 is formed on a transparent substrate 31 and operates as partition walls. In FIGS. 3A and 3B, reference numeral 36 denotes ink. If the upper surface of the black matrix 33 is ink-repellent, the applied ink 36 is retained in the right openings of the black matrix 33 and would not flow into any adjacent colored sections as shown in FIG. 3B. However, if the upper surface of the black matrix 33 is poorly ink-repellent, the applied ink 36 can spread over the black matrix to wet the latter so that it can be intermingled with the ink applied to adjacent openings as shown in FIG. 3A.

Generally, fluorine compounds are more ink-repellent than silicon compounds. For instance, Japanese Patent Application Laid-Open No. 2000-35511 discloses a method of forming a positive-type resist pattern on a light-shielding section and applying an ink-repellent chemical agent onto the pattern. It also discloses the use of a fluorine compound as an ink-repellent chemical agent. However, with the proposed method, the positive-type resist pattern formed on the light-shielding section needs to be removed after forming colored sections, and a problem of dissolution, separation and swelling of pixels can occur when removing the resist pattern.

As a technique of fluorinating the surface of a resin layer, the Journal of the Japan Society of Chemistry, vol. 10, pp. 1916-1923 (1985), proposes a method of treating with reactive gas of a fluorine compound by turning it into plasma. Japanese Patent Application Laid-Open No. 11-271753 and Japanese Patent Application Laid-Open No. 11-32974 disclose a technique of applying the above method to a color filter. According to these patent documents, partition walls are made to show a multi-layer structure of a lower layer having an affinity for ink and an upper layer which is rendered to have no affinity to ink by subjecting it to a plasma-treatment using gas containing a fluorine compound.

However, according to either of the above-cited patent documents, the partition walls must be made to show a multi-layer structure so that a photolithography process must be repeated a plurality of times, thereby making the overall process a complex one, which in turn raises the manufacturing cost and reduces the manufacturing yield.

On the other hand, the problem of "blank areas" mostly arises when the applied ink cannot spread sufficiently and uniformly in the areas surrounded by partition walls and can end up with a defective display effect due to uneven color distribution and poor color contrast.

FIGS. 4A and 4B of the accompanying drawings schematically illustrate blank areas. The members in FIGS. 4A and 4B that are the same as those of FIGS. 3A and 3B are denoted respectively by the same reference numerals. In FIGS. 4A and 4B, reference numeral 38 denotes a blank area.

In recent years, in the technological field of color filters for TFT type liquid crystal elements, the openings of the black matrix 33 are normally made to show a complex profile and have a number of corners in order to protect the TFTs against external light and/or obtain a large aperture ratio and bright displayed images. Then, there arises a problem that the applied ink 36 does not spread satisfactorily to the corners as illustrated in FIG. 4A. Additionally, as a photolithography process involving the use of resist is normally employed to form a black matrix 33, various contaminants contained in the resist can adhere to the surface of the transparent substrate 31 to prevent the applied ink 36 from spreading satisfactorily. Furthermore, if the lateral surfaces of the black matrix 33 are extremely ink-repellent when compared with the surface of the transparent substrate 31, the ink 36 can be repelled by the lateral surfaces of the black matrix 33 in a manner as shown in FIG. 4B, so that the contact areas of the ink 36 and the black matrix 33 can show a faded color.

As an attempt to prevent the problems of intermingling of colors and blank areas, Japanese Patent Application Laid-Open No. 9-203803 proposes the use of a substrate that is processed to show affinity for ink so as to make the (recessed) areas surrounded by the black matrix (projecting sections) show a contact angle of smaller than 20° relative to water. As a method of providing the substrate with affinity for ink, the patent document teaches the use of a water-soluble levelling agent or a water-soluble surface-active agent. The document further discloses a technique of treating the surfaces of the projecting sections preliminarily with an ink-repellent treatment agent to make the surfaces ink-repellent. More specifically, it describes the use of a fluorine-containing silane coupling agent as an ink-repellent treatment agent and that of a fluorine type solvent for the purpose of coating. According to the above patent document, only the top surfaces of the projecting sections are made ink-repellent and the lateral surfaces thereof are not (1) by using layers of two different materials so that the projecting sections per se may have such properties; (2) by covering the areas of the transparent substrate other than the projecting sections with resist and treating only the top surfaces of the projecting sections for ink-repellence; or (3) by forming a resist layer on the transparent substrate, treating the entire surface for ink-repellence and subsequently forming projecting sections by patterning the resist layer by means of a photolithography process.

Japanese Patent Application Laid-Open No. 9-230129 also describes a technique of providing the recessed areas with affinity for ink by irradiating the transparent substrate with energy rays. Again, according to the above patent document, only the top surfaces of the projecting sections are treated for ink-repellence by applying a photosensitive material for forming projections onto a glass substrate, treating the entire surface with an ink-repellent treatment agent and subsequently patterning the photosensitive material in a photolithography process. Thereafter, both the projecting sections and the recessed areas are treated or either the projecting sections or the recessed areas are selectively treated to provide them with affinity for ink by means of irradiation of energy rays.

However, with any of the above described methods, as the surface of the projecting sections is treated for ink-repellence and subsequently the recessed areas are treated so as to be provided with affinity for ink, the ink-repellence of the surface of the projecting sections is reduced during the treatment for affinity for ink. Therefore, it is difficult for the surface of the transparent substrate and the lateral surfaces of the black matrix to be provided with sufficient affinity for ink and, at the same time, for the top surface of the black matrix to be made satisfactorily ink-repellent. Furthermore, while Japanese Patent Application Laid-Open No. 2000-18771 proposes a technique of providing partition walls with ink-repellence by treating them with gas plasma of a fluorine compound, since the treatment for ink-repellence is carried out after a treatment for affinity for ink, ink would not wet the partition walls nor spread in areas where ink is applied to consequently give rise to problematic blank areas.

The above problem equally arises when manufacturing electroluminescence elements by means of an ink-jet system. More specifically, when organic semiconductor materials that emit light in R, G and B, respectively, are used as inks and pixels (light-emitting layers) formed by applying the inks in corresponding areas that are surrounded by partition walls, the light-emitting layers would not emit light in desired color to a desired level of brightness in areas where inks are intermingled between adjacent light-emitting layers. Additionally, when the electroluminescence element is made to have a single light-emitting layer, all the pixel areas surrounded by partition walls are filled with an equal amount of ink. Therefore, if ink flows from a pixel area into an adjacent pixel area, a problem of disparity arises among pixel areas in terms of the amount of ink, which by turn gives rise to an uneven distribution of brightness. Additionally, if ink does not spread satisfactorily in each area surrounded by partition walls, the boundary zones of the light-emitting layer and the partition walls would not provide a sufficient level of brightness of emitted light. In the following description on manufacturing electroluminescence elements, mixing of inks between adjacent light-emitting layers is referred to as "intermingling of colors" and areas along the boundaries of light-emitting layers and partition walls where a problem of disparity arises in terms of brightness of emitted light are referred to as "blank areas" for the purpose of convenience.

SUMMARY OF THE INVENTION

Thus, an object of the present invention is to provide a method of manufacturing an optical element such as a color filter or an electroluminescence element in a simple process at low cost by utilizing an ink-jet system that is free from the above-identified problems so that the method can provide reliable optical elements at a high manufacturing yield. More specifically, the object of the present invention is to provide flat pixel areas surrounded by partition walls that can effectively prevent intermingling of colors, wherein the applied ink can spread satisfactorily within each pixel area. Another object of the present invention is to provide a liquid crystal element adapted to display excellent color images and comprising optical elements produced by the manufacturing method according to the invention.

According to the invention, the above objects are achieved by providing a method of manufacturing an optical element comprising at least a plurality of pixels formed on a substrate and partition walls arranged respectively between adjacent pixels, said method comprising steps of forming partition walls of a resin composition on a substrate; performing a dry etching process by irradiating the substrate carrying said partition walls formed thereon with plasma in an atmosphere containing gas selected at least from oxygen, argon and helium; performing a plasma treatment process by irradiating the substrate subjected to said dry etching process with plasma in an atmosphere containing at least fluorine atoms; and forming pixels by applying ink to the areas surrounding by the partition walls by means of an ink-jet system.

For the purpose of the invention, the term "ink" generally refers to any liquid showing one or more than one optically or electrically functional features when dried and set, and hence it is not limited to a conventional coloring material.

DESCRIPTION OF THE PREFERRED EMBODIMENTS

A method of manufacturing an optical element according to the invention is characterized in that pixels are formed by applying ink to areas surrounded by partition walls by means of an ink-jet system after subjecting a substrate carrying partition walls thereon to a dry etching process and a plasma treatment process. An optical element manufactured by a manufacturing method according to the invention may typically be a color filter or an electroluminescence element. Now, an optical element according to the invention will be described by referring to the accompanying drawings that illustrate preferred embodiments of the invention.

Figure 10:
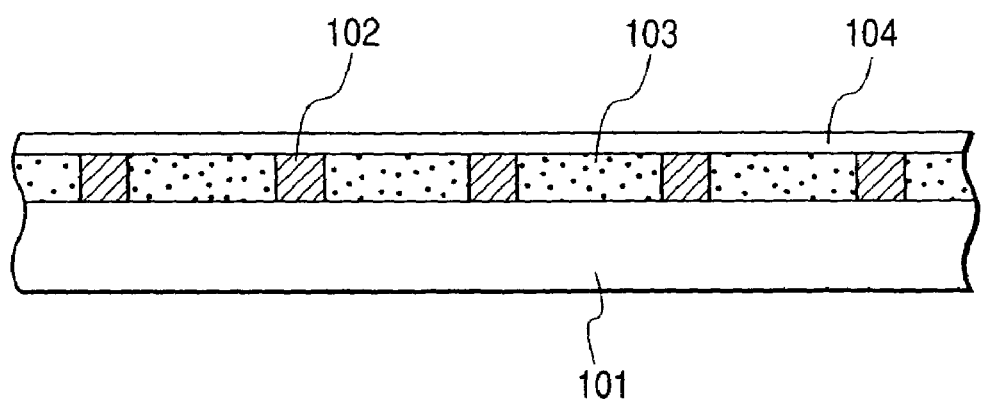
FIG. 10 is a schematic cross-sectional view of a color filter prepared as another embodiment of an optical element according to the invention.

FIG. 10 is a schematic cross-sectional view of an embodiment of an optical element according to the invention, which is a color filter.

Referring to FIG. 10, the embodiment comprises a transparent substrate 101, a black matrix 102 operating as partition walls, colored sections 103 operating as pixels and a protection layer 104 which is provided whenever necessary. When preparing a liquid crystal element by using a color filter according to the invention, a transparent electroconductive film made of a transparent electroconductive material such as ITO (indium-tin-oxide) is formed on the colored sections 103 or the protection layer 104 arranged on the colored sections 103 in order to drive the liquid crystal.

Figure 11:
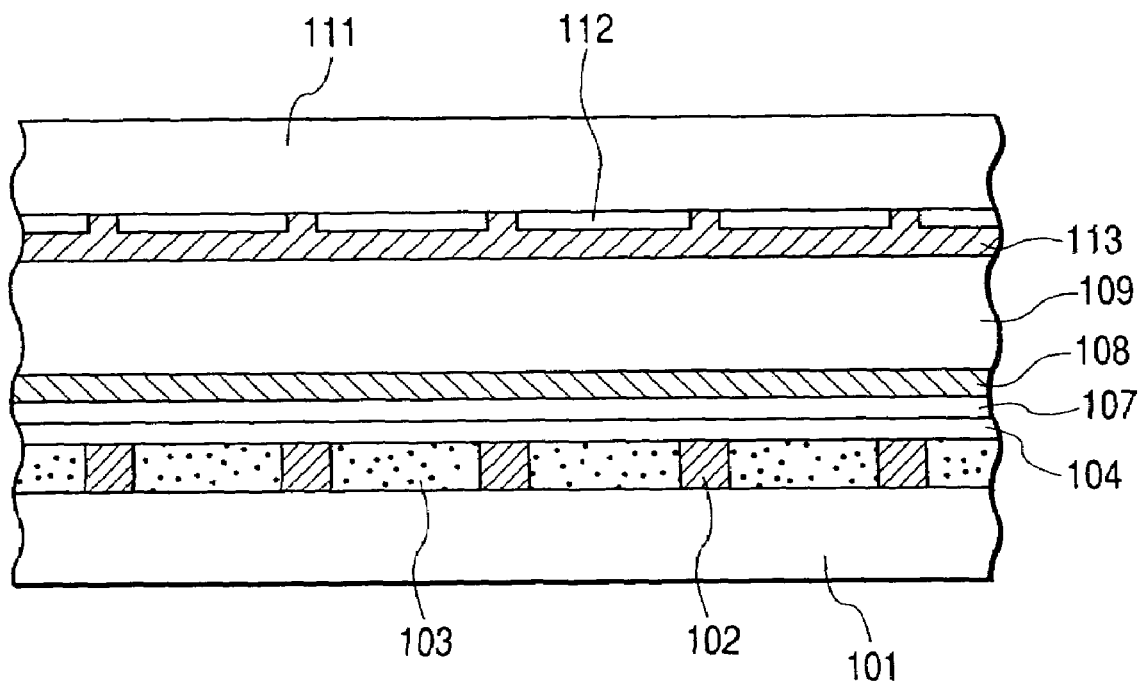
FIG. 11 is a schematic cross-sectional view of an embodiment of a liquid crystal element according to the invention.

FIG. 11 is a schematic cross-sectional view of part of an embodiment of a liquid crystal element formed by using a color filter as shown in FIG. 10. The liquid crystal element comprises a common electrode (transparent electroconductive film) 107, an orientation film 108, liquid crystal 109, an opposite substrate 111, pixel electrodes 112 and an orientation film 113 in addition to the components illustrated in FIG. 10, which are denoted respectively by the same reference symbols and will not be described any further.

The color liquid crystal element is prepared typically by arranging the substrate 101 of the color filter and the opposite substrate 111 vis-à-vis, pouring liquid crystal 109 into the gap between the substrates and hermetically sealing the assembly. The substrate 111 of the liquid crystal element carries on the inner surface thereof TFTs (not shown) and pixel electrodes 112 that are arranged in the form of a matrix. On the other hand, the substrate 101 of the color filter side carries on the inner surface thereof colored sections 103 of the color filter in such a way that spots of R, G and B are arranged regularly at positions opposite to the respective pixel electrodes 112 and then a transparent common electrode 107 is formed thereon. Additionally, the two substrates carry thereon respective orientation films 108, 113 that orient liquid crystal molecules in a predetermined direction. The substrates are arranged vis-à-vis relative to each other by way of spacers (not shown) and bonded together by means of a sealing material (not shown). Then, liquid crystal 109 is filled into the gap separating the substrates.

In the case where the liquid crystal element is of the transmission type, the substrate 111 and the pixel electrodes 112 are formed of a transparent material, and a polarizing plate is bonded to the outer surface of each of the substrates. Then, images are displayed by using a backlight prepared typically by combining a fluorescent lamp and a scattering plate and making the liquid crystal compound operate as an optical shutter for varying the ratio of transmission of light from the backlight. In the case where the liquid crystal element is of the reflection type, either the substrate 111 or the pixel electrodes 112 are formed of a material having a light-reflecting effect, or a reflection layer is formed on the substrate 111 and a polarizing plate is arranged at the outside of the transparent substrate 101 so as to reflect light entering from the color filter side and display images.

Figure 9:
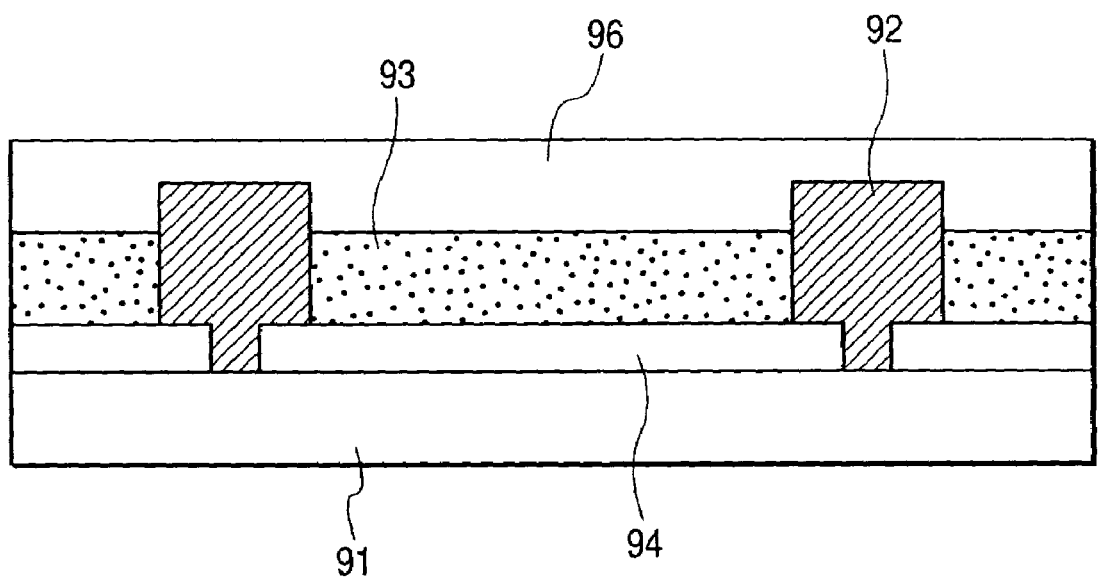
FIG. 9 is a schematic cross-sectional view of an electroluminescence element prepared as an embodiment of an optical element according to the invention.

FIG. 9 is a schematic cross-sectional view of an organic electroluminescence element (to be referred to as EL element hereinafter) prepared as another embodiment of an optical element according to the invention. Referring to FIG. 9, the EL element comprises a drive substrate 91, partition walls 92, light-emitting layers 93 operating as pixels, transparent electrodes 94 and a metal layer 96. Note that only a single pixel area is shown in FIG. 9 for the purpose of simplification.

The drive substrate 91 carries thereon TFTs (not shown), a wiring film and an insulating film to show a multi-layer structure and a voltage is applied on a pixel by pixel basis between the metal layer 96 and the transparent electrodes 94 arranged for respective light-emitting layers 93. The drive substrate 91 is prepared by means of a known thin film process.

No particular limitations are provided for the structure of an organic EL element according to the invention so long as a light-emitting material can be filled in each space defined by the partition walls made of a resin composition and arranged between a pair of electrodes, or an anode and a cathode, at least one of which is transparent or translucent. Additionally, any known structure can be used for the organic EL element with or without modifying it in various ways.

The multi-layer structure may be any of the following:

(1) electrode (cathode)/light-emitting layer/hole-injecting layer/electrode (anode)

(2) electrode (anode)/light-emitting layer/electron-injecting layer/electrode (cathode)

(3) electrode (anode)/hole-injecting layer/light-emitting layer/electron-injecting layer/electrode (cathode)

(4) electrode (anode or cathode)/light-emitting layer/electrode (cathode or anode)

An organic compound layer having any of the above listed multi-layer structures may be used for an EL element according to the invention.

Of the above-listed multi-layer structures, (1) and (2) are referred to as two-layered structures, while (3) and (4) are referred to, respectively, as a three-layered structure and a single-layered structure. While an organic EL element according to the invention may basically have one of these structures, it may alternatively have a structure obtained by combining any of these structures, and each of the layers thereof may be provided in multiple. Additionally, a full color display may be realized by combining it with a color filter. No particular limitations are provided for the profile, the size, the material and the manufacturing method of an organic EL element according to the invention, and, therefore, they may be defined appropriately depending on the application of the organic EL element.

Furthermore, no particular limitations are provided for the light-emitting material of the light-emitting layer of an organic EL element according to the invention, so that any appropriate material may be used for the light-emitting layer. However, a low molecular weight fluorescent material or a high molecular weight (polymeric) fluorescent material may preferably be used for the light-emitting layer, and the use of a polymeric fluorescent substance is particularly preferable for the purpose of the invention.

Low molecular weight organic compounds that can be used for the light-emitting layer of an organic EL element according to the invention include non-limitatively naphthalene and its derivatives, anthracene and its derivatives, perylene and its derivatives, coloring matters of the polymethine type, the xanthene type, courmarin type and the cyanine type, metal complexes of 8-hydroxyquinoline and its derivatives, aromatic amines, tetraphenylcyclopentadiene and its derivatives and tetraphenylbutadiene and its derivatives. More specifically, known materials including those described in Japanese Patent Application Laid-Open No. 57-51781 and Japanese Patent Application Laid-Open No. 59-194393 can be used for the purpose of the invention.

High molecular weight organic compounds that can be used for the light-emitting layer of an organic EL element according to the invention include non-limitatively polyphenylene-vinylene, polyallylene, polyalkylthiophene and polyalkylfluorene.

When a polymeric fluorescent substance is used for the light-emitting layer of an organic EL element according to the invention, it may be a random, block or graft copolymer or a polymer having an intermediary structure of any of them such as a random copolymer partly showing characteristics of a block copolymer. From the viewpoint of obtaining a polymeric fluorescent substance showing a high quantum yield of fluorescent light, the use of a random copolymer showing characteristics of a block copolymer or a graft or block copolymer is preferable to the use of a completely random copolymer. Since an organic EL element according to the invention utilizes light emitted from a thin film, a solid polymeric fluorescent substance is used for the purpose of the invention.

Solvents that can advantageously be used for the selected polymeric fluorescent substance include chloroform, methylene chloride, dichloroethane, tetrahydrofuran, toluene and xylene. The polymeric fluorescent substance is dissolved into any of such solvents normally by 0.1 wt % or more, although the ratio may vary depending on the structure and the molecular weight of the polymeric fluorescent substance.

An electron-transporting layer may be additionally arranged between the layer containing a light-emitting material and the cathode of an organic EL element according to the invention. Then, an electron-transporting material is used for the electron-transporting layer alone or as a mixture with a hole-transporting material and a light-emitting material and operates for transferring electrons injected from the cathode to the light-emitting material. No particular limitations are provided for the electron-transporting material so that it may be selected from appropriate known compounds.

Examples of electron-transporting materials that can be used for the purpose of the invention include nitro-substituted fluorenone derivatives, anthraquinodimethane derivatives, diphenylquinone derivatives, thiopyran dioxide derivatives, heterocyclic tetracarboxylic anhydrides and carbodiimide.

Examples of electron-transporting materials that can be used for the purpose of the invention additionally include fluorenylidenemethane derivatives, anthraquinodimethane derivatives, anthrone derivatives and oxadiazole derivatives, as well as metal complexes of 8-hydroxyquinoline and its derivatives that are listed above as materials that can be used for forming the light-emitting layer.

Now, a typical method of preparing an organic EL element having a multi-layer structure according to the invention will be described below. A transparent or translucent electrode formed on a transparent substrate typically made of transparent glass or transparent plastic may be used for each of the pair of electrodes including an anode and a cathode of an organic EL element according to the invention.

In a light-emitting element according to the invention, the light-emitting layer is typically realized in the form of a thin film in combination with an appropriate binder resin. A binder resin to be used for the purpose of the invention can be selected from a wide variety of cohesive resins. Examples of such cohesive resins non-limitatively include polyvinylcarbazole resin, polycarbonate resin, polyester resin, polyallylate resin, butyral resin, polyester resin, polyvinylacetal resin, diallylphthalate resin, acrylic resin, methacrylic resin, phenol resin, epoxy resin, silicone resin, polysulfone resin and urea resin. Any of such resins may be used alone or in the form of copolymer of two or more than two resin substances. A material showing a large work function is preferably used for the anode. Examples of materials that can advantageously be used for the anode include nickel, gold, platinum, palladium, selenium, rhenium, iridium, alloys of any of them, tin oxide, indium-tin-oxide (ITO) and copper iodide. Additionally, electroconductive polymers such as poly(3-methylthiophene), polyphenylenesulfide and polypyrrole also provide candidate materials for the anode.

On the other hand, a material showing a small work function is preferably used for the cathode. Candidate materials of the cathode include silver, lead, tin, magnesium, aluminum, calcium, manganese, indium, chromium and alloys of any of them.

Now, a method of manufacturing an optical element according to the invention will be described below by referring to the relevant drawings.

FIGS. 1A through 1H and FIGS. 2A through 2H are schematic views of an optical element according to the invention, illustrating different steps of an embodiment of a method of manufacturing an optical element according to the invention. Note that steps (a) through (h) described below correspond respectively to FIGS. 1A through 1H and FIGS. 2A through 2H. FIGS. 1A through 1H are schematic plan views of the optical element, and FIGS. 2A through 2H are schematic cross-sectional views of the element. Throughout the drawings, reference numerals 1, 2, 3, 4, 5, 6 and 7 respectively denote a substrate, a resin composition layer, a partition wall, an opening defined by partition walls, an ink-jet head, ink and a pixel.

Step (a)

A substrate 1 is provided. The substrate 1 is a transparent substrate 101 when manufacturing a color filter as shown in FIG. 10. While it is typically a glass substrate, a plastic substrate may alternatively be used when the latter shows a desired level of transparency and mechanical strength for the purpose of forming a liquid crystal element.

When manufacturing an EL element as shown in FIG. 9, the substrate 1 is a drive substrate 91 carrying thereon transparent electrodes 94. If light is irradiated from the side of the substrate, a transparent substrate such as a glass substrate is used for the drive substrate 91. The substrate is preferably subjected to a surface treatment such as plasma treatment, UV treatment or coupling treatment so that a light-emitting layer 93 may easily adhere thereto in a subsequent step.

Step (b)

A resin composition layer 2 is formed on the substrate 1 to produce partition walls 3. The partition walls 3 of an optical element according to the invention correspond to the black matrix 102 of a color filter as shown in FIG. 10 and to the partition walls 92 of an electroluminescence element as shown in FIG. 9. When manufacturing a color filter, the partition walls 3 are preferably made to operate as light-shielding layer 102 for shielding light between adjacent pixels as shown in FIG. 10. Then, the partition walls 3 may be realized in the form of a black matrix as shown in FIG. 10 or in the form of black stripes. The partition walls 3 may also be made to operate as a light-shielding layer when manufacturing an EL element.

Examples of resin compositions that can be used for forming the partition walls 3 for the purpose of the present invention include photosensitive resins and non-photosensitive resins such as epoxy resins, acrylic resins, polyimide resins including polyamide-imide, urethane resins, polyester resins and polyvinylic resins. However, in view of preferably making the resin composition to be used for the partition walls thermally resistant at a temperature higher than 250° C., the use of any of epoxy resins, acrylic resins and polyimide resins is preferable.

When the partition walls 3 are made to operate as a light-shielding layer, the resin composition layer 2 is prepared by using a black resin composition in which a light-shielding agent is dispersed. Then, carbon black is preferably used as a light-shielding agent in order to obtain a high degree of ink-repellence and an appropriate degree of surface coarseness for the partition walls 3. For the purpose of the present invention, carbon black prepared by using a contact method that may be referred to as channel black, roller black or disk black, a furnace method that may be referred to as gas furnace black or oil furnace black or a thermal method that may be referred to as thermal black or acetylene black may be used. Particularly, for the purpose of the invention, the use of channel black, gas furnace black or oil furnace black is preferable. If necessary, a mixture of pigments of R, G and B may be added. Commercially available black resist may alternatively be used for the purpose of the invention. Also if necessary, the light-shielding layer may be made highly electrically resistant.

The resin composition layer 2 can be formed by an appropriate method selected from spin coating, roll coating, bar coating, spray coating, dip coating and printing.

Step (c)

When a photosensitive material is used for the resin composition layer 2, the partition walls 3 are formed with a plurality of openings 4 by patterning the resin composition layer 2 by means of photolithography. When a non-photosensitive material is used for the resin composition layer 2, the partition walls 3 may be formed by patterning the resin composition layer 2 by means of wet or dry etching using photoresist as a mask or a lift-off technique.

Step (d)

The substrate 1 now carrying the partition walls 3 thereon is subjected to a dry etching process. More specifically, gas containing at least oxygen, argon or helium is introduced, and the substrate 1 is subjected to a reduced pressure plasma treatment or an atmospheric pressure plasma treatment where the substrate 1 is irradiated with plasma in an atmosphere of reduced pressure or atmospheric pressure, whichever is appropriate.

As a result of the dry etching process, the contaminants adhering to the surface of the substrate 1 during the process of forming the partition walls 3 are removed, and the surface is cleansed to improve the wettability (the affinity) of ink 6 in a subsequent step and satisfactorily disperse ink 6 within the openings 4. Additionally, as a result of the plasma treatment, the surface layer of the partition walls is made coarser to raise its ink-repellence.

Step (e)

After the dry etching process, the substrate 1 is irradiated with plasma in an atmosphere of gas containing at least fluorine atoms. As a result of the plasma process, fluorine and/or one or more than one fluorine compounds in the introduced gas penetrate into the surface layer of the partition walls 3 to raise the ink-repellence of the surface layer of the partition walls 3.

Particularly, the partition walls 3 show a very high degree of ink-repellence when they are made of a resin composition containing carbon black. This may be because carbon black becomes exposed to the surface of the partition walls 3 as a result of the dry etching process of Step (d) so that fluorine and/or fluorine compounds become bonded to carbon black in the plasma process of this step. Therefore, the partition walls 3 preferably contain carbon black for the purpose of the invention.

Gas containing at least fluorine atoms that is introduced in this step may be a halogen gas selected from one or more than one of $CF_4$, $CHF_3$, $C_2F_6$, $SF_6$, $C_3F_8$ and $C_5F_8$. Particularly, the use of $C_5F_8$ (octafluorocyclopentene) is highly preferable because its ozone destructing ability is nil, and the life span in the atmosphere is as short as 0.98 years if compared with other gases ($CF_4$:fifty thousand years; $C_4F_8$: 3,200 years). Thus, it shows an earth-warming coefficient of 90 (cumulative value of 100 years assuming that $CO_2$=2), which is by far smaller than the counterpart of any known gas ($CF_4$:6,500; $C_4F_8$:8,700) so that it is highly effective for protecting the ozone layer and the environment of the planet. Therefore, the use of $C_5F_8$ is highly preferable for the purpose of the invention.

If necessary, gas introduced in this step may additionally contain oxygen, argon and/or helium. For the purpose of the invention, the degree of ink-repellence realized in this step can be controlled by using a gaseous mixture of one or more than one halogen gases selected from $CF_4$, $CHF_3$, $C_2F_6$, $SF_6$, $C_3F_8$ and $C_5F_8$ as listed above and $O_2$. The mixing ratio of $O_2$ is preferably 30% or less. When the mixing ratio (amount) of $O_2$ exceeds 30% in the gaseous mixture, the oxidizing reaction of $O_2$ becomes prevalent so that the effect of improving the ink-repellence can be reduced and the resin can be damaged.

Methods that can be used for generating plasma in this step and the preceding dry etching step include the low frequency electric discharge method, the high frequency electric discharge method and the microwave discharge method. The pressure, the gas flow rate, the electric discharge frequency, the process time and other conditions for plasma irradiation can be selected appropriately.

Figure 1A:
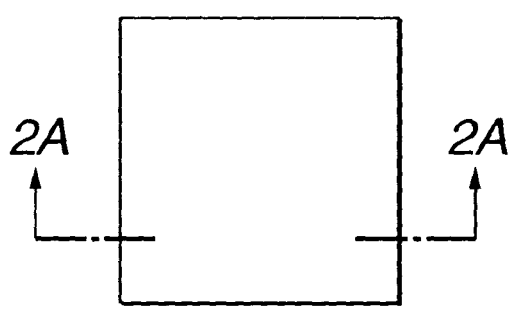
FIGS. 1A, 1B, 1C, 1D, 1E, 1F, 1G and 1H are schematic plan views of an optical element according to the invention, illustrating different steps of an embodiment of a method of manufacturing an optical element according to the invention.
Figure 2A:
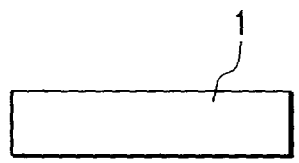
FIGS. 2A, 2B, 2C, 2D, 2E, 2F, 2G and 2H are schematic cross-sectional views corresponding respectively to FIGS. 1A, 1B, 1C, 1D, 1E, 1F, 1G and 1H.
Figure 1B:
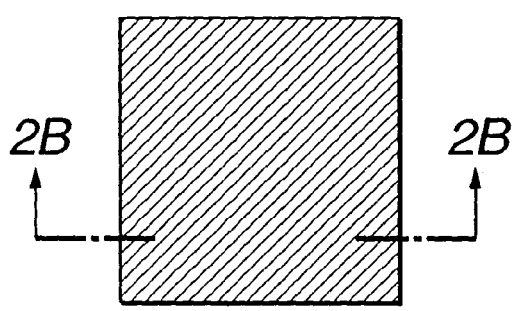
Figure 2B:
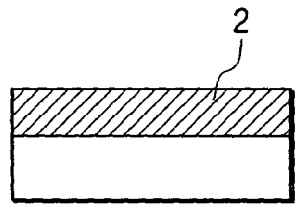
Figure 1C:
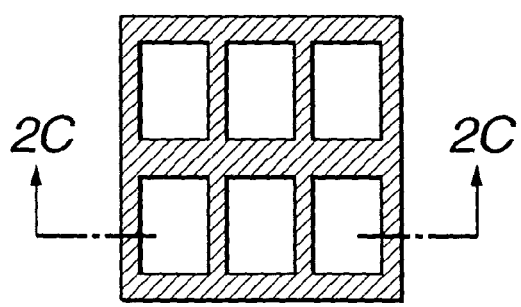
Figure 2C:
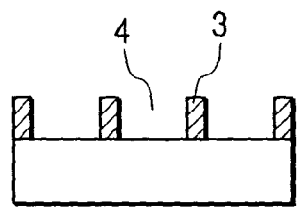
Figure 1D:
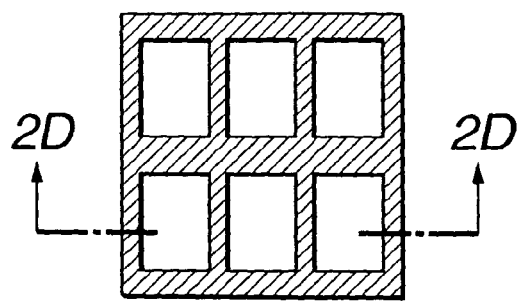
Figure 2D:
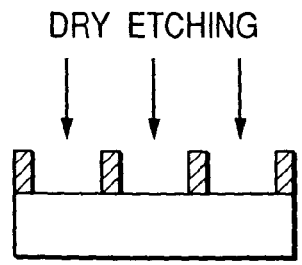
Figure 1E:
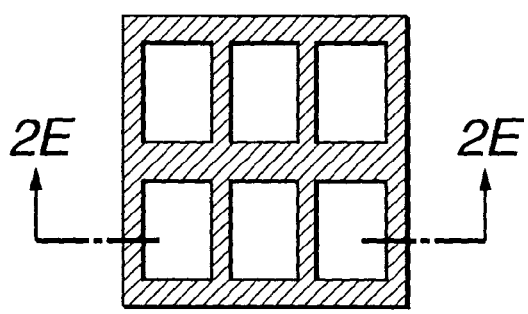
Figure 2E:
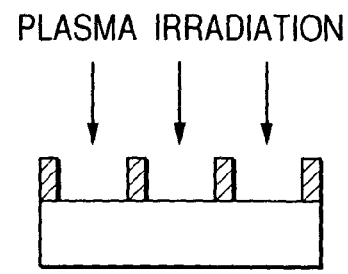
Figure 1F:
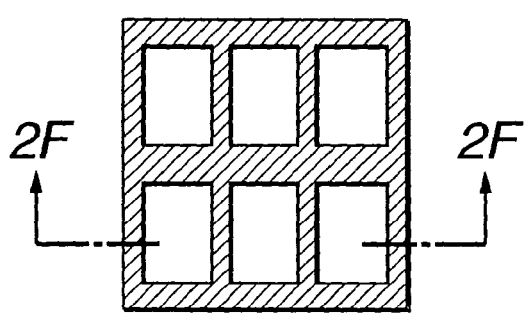
Figure 2F:
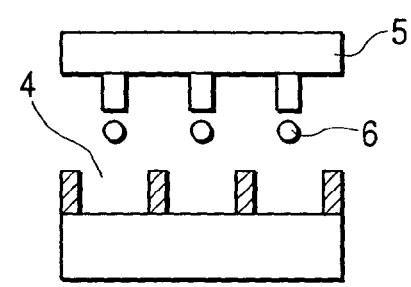
Figure 1G:
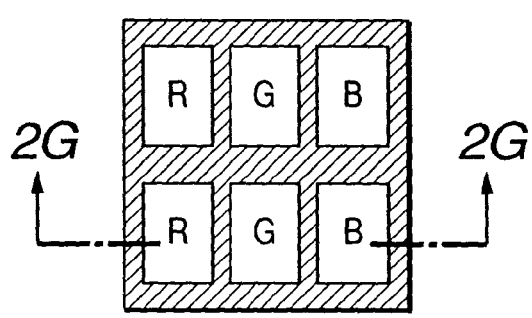
Figure 2G:
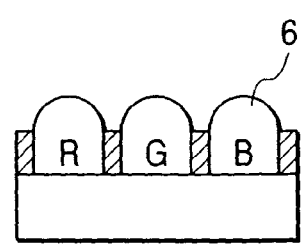
Figure 1H:
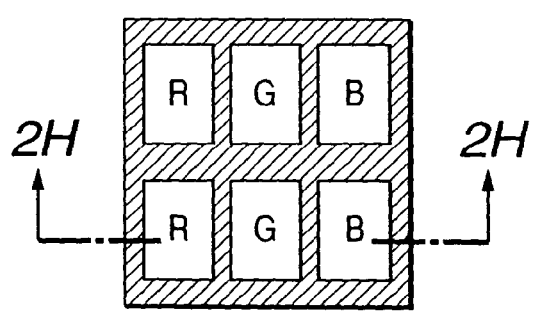
Figure 2H:
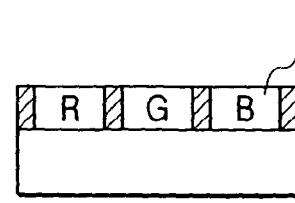
Figure 3A:
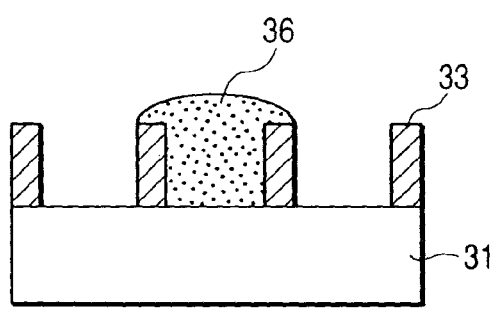
FIGS. 3A and 3B are schematic and conceptual illustrations of the problem of intermingling of colors that arises with known methods of manufacturing an optical element using an ink-jet system.
Figure 3B:
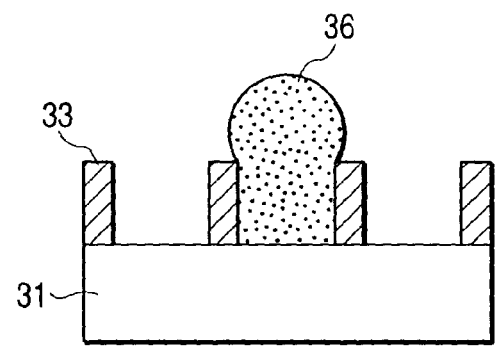
Figure 4A:
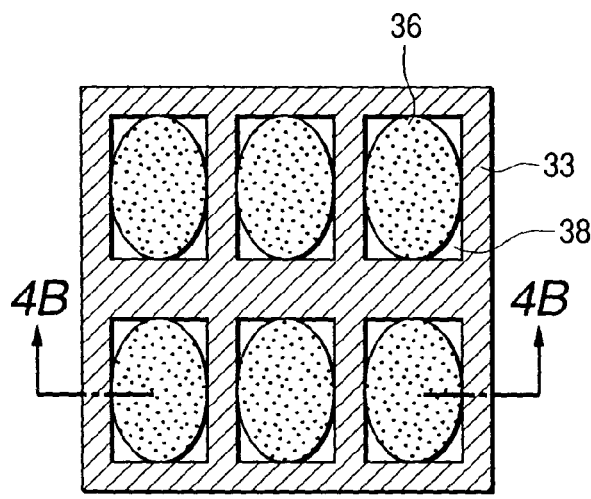
FIGS. 4A and 4B are schematic and conceptual illustrations of the problem of blank areas that arises with known methods of manufacturing an optical element using an ink-jet system.
Figure 4B:
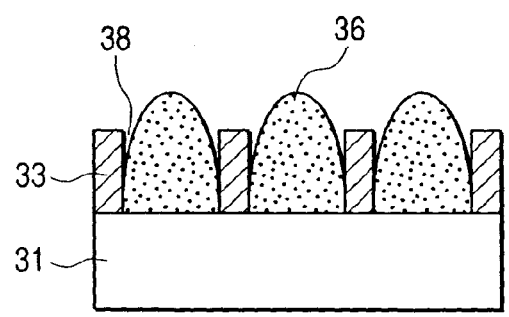
Figure 5:
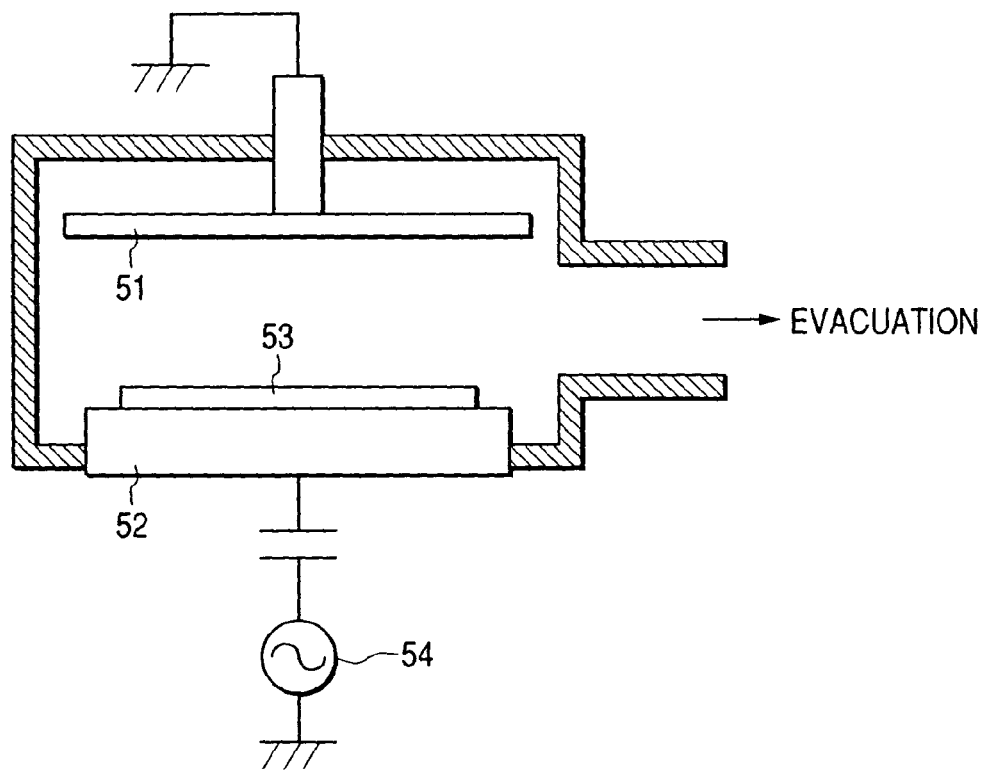
FIG. 5 is a schematic illustration of the configuration of a plasma generator that can be used with the manufacturing method of the present invention.
Figure 6:
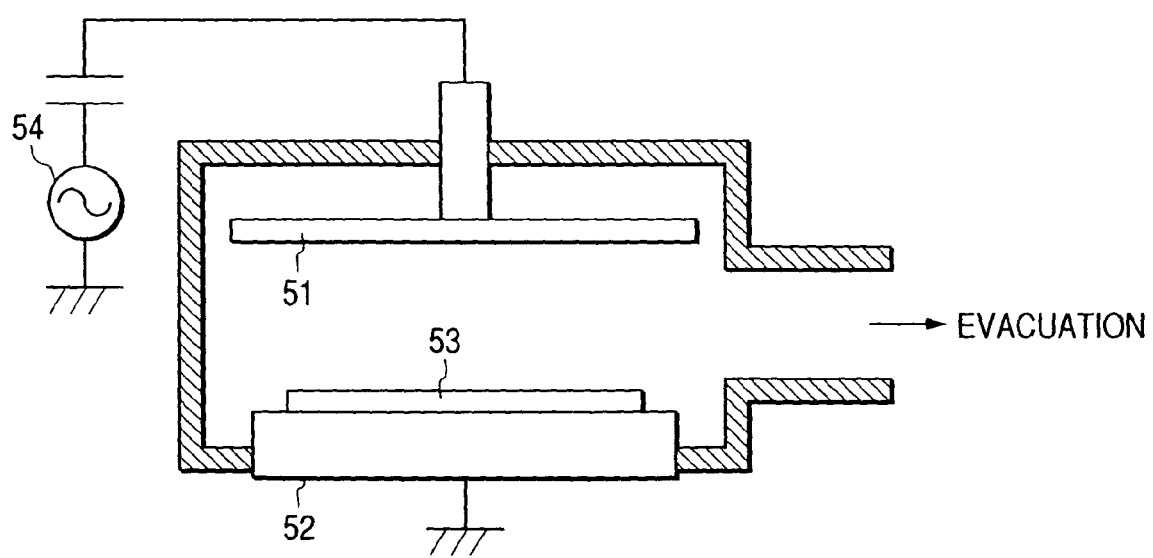
FIG. 6 is a schematic illustration of the configuration of another plasma generator that can be used with the manufacturing method of the present invention.

FIGS. 5 and 6 schematically illustrate plasma generators that can be used for the dry etching step and the plasma treatment step of a method of manufacturing an optical element according to the invention. In FIGS. 5 and 6, reference numerals 51, 52, 53 and 54 respectively denote an upper electrode, a lower electrode, a substrate to be treated and a high frequency power source. With either of the illustrated plasma generators, a high frequency voltage is applied to the two electrodes in the form of plates arranged in parallel with each other to generate plasma. FIG. 5 shows a cathode coupling-type plasma generator, and FIG. 6 shows an anode coupling-type plasma generator. With either type, the ink-repellence and the surface coarseness of the surface of the partition walls 3 and the affinity for ink of the surface of the substrate 1 can be controlled in a desired manner by controlling the pressure, the gas flow rate, the electric discharge frequency, the process time and other conditions.

Of the plasma generators of FIGS. 5 and 6, that of the cathode coupling-type shown in FIG. 5 can be used for reducing the dry etching process time, and hence is advantageous when it is used for the dry etching step. On the other hand, the plasma generator of the anode coupling-type shown in FIG. 6 is advantageous in that it does not unnecessarily damage the substrate 1. Therefore, the plasma generator to be used for the dry etching step and the one to be used for the plasma treatment step may be selected appropriately depending on the material of the substrate 1 and that of the partition walls 3.

For the purpose of the invention, the degree of ink-repellence of the surface of the partition walls 3 after the plasma treatment process is preferably such that the contact angle of pure water is not smaller than 110°. Intermingling of colors can easily occur so that ink cannot be applied at a high rate when the contact angle is smaller than 110°. Particularly, when manufacturing color filters, it is difficult to manufacture color filters showing a high color purity if the contact angle is smaller than 110°. With known methods, it is difficult to raise the degree of ink-repellence of the surface of the partition walls 3 above 110°, and it is slightly less than 110° if PTFE (polytetrafluoroethylene) that is highly ink-repellent is used.

According to the invention, it is possible to make the degree of ink-repellence of the surface of the partition walls 3 not smaller than 110° for the above-described reason when the partition walls 3 are made of a resin composition containing carbon black and subjected to a dry etching process and a subsequent plasma treatment process. For the purpose of the invention, the contact angle is preferably not smaller than 120° and not greater than 135°. The problem of blank areas can be prevented from taking place even if ink is applied at a low rate provided that the ink-repellence of the surface of the partition walls 3 is not greater than 135°.

The degree of affinity for ink of the surface of the substrate 1 is preferably such that the contact angle of pure water is not greater than 20°. Ink can wet and spread over the surface of the substrate 1 satisfactorily when the contact angle of pure water is not smaller than 20°, so that no blank areas appear even if the surface of the partition walls 3 shows a high degree of ink-repellence. More preferably, the contact angle of pure water relative to the surface of the substrate is not greater than 10°.

Figure 7A:
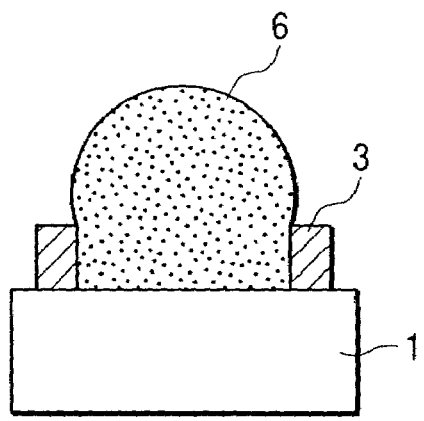
FIGS. 7A and 7B are schematic cross-sectional views of a pixel produced by the manufacturing method of the present invention as viewed immediately after the application of ink.
Figure 7B:
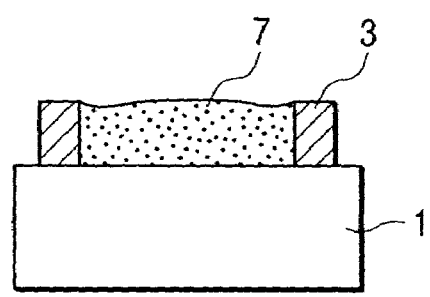
Figure 8A:
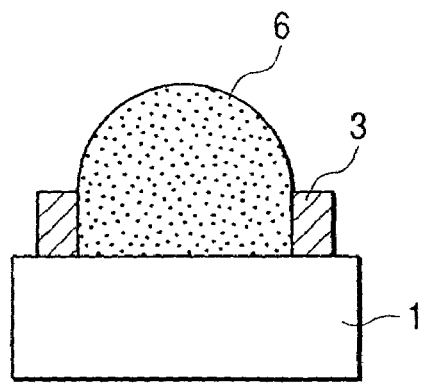
FIGS. 8A and 8B are schematic cross-sectional views of a pixel produced by a known manufacturing method as viewed immediately after the application of ink.

The inventor of the present invention has found that the appearance of blank areas depends not only on the ink-repellence of the surface of the partition walls 3 and the affinity for ink of the surface of the substrate 1, but also on the surface coarseness of the top surfaces and the lateral surfaces of the partition walls 3. The ink 6 applied to the openings 4 by means of an ink-jet system fills the recesses defined by the partition walls 3, and the spreading tendency of the ink 6 is suppressed by the ink-repellence of the surface of the partition walls 3 at and near the top thereof, as illustrated in FIGS. 7A and 8A. The ink 6 applied at an enhanced rate reduces its volume as a result of the setting steps that involve heat treatment. If the surface of the partition walls 3 is very coarse, it contacts ink over a large area so that, once ink 6 contacts the lateral surface of the partition walls 3, it can easily maintain the contact regardless of the ink-repellence of the surface of the partition walls 3. Therefore, the surface of the pixels 7 can easily become flat when the ink 6 is completely set as shown in FIG. 7B.

Figure 8B:
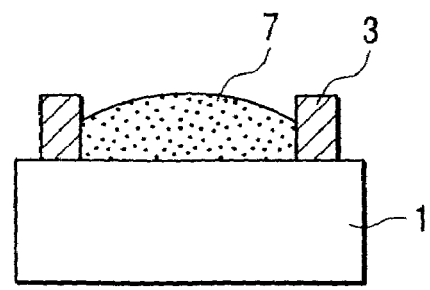

If, on the other hand, the surface of the partition walls 3 is flat and smooth, the surface of ink 6 falls from the initial positions to be repelled by the lateral surfaces of the partition walls 3 because of the reduction of its volume due to setting and the ink-repellence of the surfaces as shown in FIG. 8B. Thus, the pixels 7 show a low density along the periphery thereof in the case of a color filter and a reduction of luminance in the case of an EL element.

For the above reasons, the arithmetic mean deviation (Ra) of the surface of the partition walls 3 is preferably not smaller than 3 nm. On the other hand, the linearity of the pattern of the partition walls 3 can be adversely affected and the openings defined by the partition walls 3 can dimensionally vary to make it difficult to have a large aperture ratio when the mean deviation (Ra) exceeds 50 nm. Therefore, for the purpose of the present invention, the mean deviation (Ra) of the surface of the partition walls 3 is preferably between 3 nm and 50 nm, more preferably between 4 nm and 20 nm. Then, blank areas are prevented from appearing without adversely affecting the profile of the pattern of the partition walls 3, and the pixel surface is flattened.

According to the invention, the surface coarseness of the partition walls 3 can be controlled by forming the partition walls 3 from a resin composition containing carbon black and appropriately selecting the conditions for the dry etching step and the plasma treatment step. In other words, the surface coarseness can vary depending on the method of plasma generation, the distance separating the electrodes, the type of gas, the RF power and the process time of the dry etching step. Particularly, a desired degree of surface coarseness can be realized by controlling the RF power and the process time. The surface coarseness can also vary depending on the method of plasma generation, the distance separating the electrodes, the type of gas, the RF power and the process time selected for the plasma treatment step, of which the type of gas is particularly significant. For example, the surface coarseness will be more remarkable when a gaseous mixture of $CF_4$ and $O_2$ is used than when only $CF_4$ is used as the gas containing fluorine atoms. The surface coarseness can also vary depending on the mixing ratio of $O_2$ gas in the gaseous mixture. In view of ink-repellence and the above-described oxidizing reaction of $O_2$, the mixing ratio of $O_2$ is preferably not greater than 30%, more preferably between 10 and 20%.

As pointed out above, as a result of the dry etching step and the plasma treatment step, only the partition walls 3 are made to show an appropriate level of surface coarseness, and the surface of the substrate 1 shows affinity for ink in the exposed areas surrounded by the partition walls 3.

Step (f)

Inks 6 of R, G and B are applied to the areas surrounded by the partition walls 3 (openings 4) of the substrate 1 from an ink-jet head 5 of an ink-jet recording system. An ink-jet head of the bubble jet type using electrothermal transducers as energy generating elements or of the piezo jet type using piezoelectric elements as energy generating elements may be used for the purpose of the invention. In the case of a color filter, inks 6 contain respective coloring agents of R, G and B that produce colored sections after setting. In the case of an EL element, on the other hand, inks 6 contains respective materials that produce light-emitting layers adapted to emit light when a voltage is applied thereto after setting. In either case, inks 6 preferably contain at least a setting ingredient, water and a solvent. Now, the compositions of inks that can be used for manufacturing a color filter by a manufacturing method according to the invention will be discussed in greater detail.

(1) Coloring Agents

Both dye-type and pigment-type coloring agents can be used in inks for the purpose of the invention. However, when pigments are used, a dispersing agent may have to be added in order to disperse the pigment uniformly in ink to consequently reduce the content ratio of the coloring agent in the overall solid content. For this reason, dye-type coloring agents are preferably used for the purpose of the invention. The coloring agents are added at a rate equal to or less than the rate at which the setting ingredient is added, which will be described hereinafter.

(2) Setting Ingredients

In view of the process resistance in the subsequent steps and reliability, inks preferably contain one or more than one cross-linkable monomers and/or polymers as ingredients for fixing the coloring agents by setting as a result of heat treatment or irradiation of light. Particularly, in view of the thermal resistance in the subsequent steps, the use of a settable resin composition is preferable for the purpose of the invention. Examples of base resin materials that can be used for the purpose of the invention include acrylic resins and silicone resins having functional groups such as hydroxy groups, carboxyl groups, alkoxy groups or amide groups; cellulose derivatives such as hydroxypropyl cellulose, hydroxyethyl cellulose, methyl cellulose carboxymethyl cellulose and their modified substances; and vinyl polymers such as polyvinyl pyrrolidone, polyvinyl alcohol and polyvinyl acetal. A cross-linking agent and/or a photoinitiator for setting the base resin material by irradiation of light or heat treatment may also be used. Specific examples of cross-linking agents that can be used for the purpose of the invention include melamine derivatives such as methylolmelamine. Examples of photoinitiators include dichromates, bisazide compounds, radical-type initiators, cationic initiators and anionic initiators. A mixture of two or more than two different photoinitiators or that of a photoinitiator and a sensitizer may also be used for the purpose of the invention.

(3) Solvents

A mixed solvent of water and an organic solvent is preferably used as a medium for inks for the purpose of the invention. Not ordinary water containing various ions, but ion-exchanged water (deionized water) is preferably used for the solvent.

Examples of organic solvents that can be used for the purpose of the invention include alkyl alcohols having 1 to 4 carbon atoms such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide, ketones and ketoalcohols such as acetone, diacetone alcohol, ethers such as tetrahydrofuran and dioxane, polyalkylene glycols such as polyethylene glycol and polypropylene glycol; alkylene glycols having an alkylene group with 2 to 4 carbon atoms such as ethylene glycol, propylene glycol, butylene glycol, triethylene glycol, thiodiglycol, hexylene glycol and diethylene glycol; glycerols; lower alkyl ethers of polyhydric alcohols such as ethylene glycol monomethyl ether, diethylene glycol methyl ether and triethylene glycol monomethyl ether; N-methyl-2-pyrrolidone and 2-pyrrolidone.

If necessary, a mixture of two or more than two organic solvents showing different boiling points may be used in place of a single solvent and a surface active agent, a defoaming agent and/or an anti-septic agent may be added to produce inks showing desired values for physical properties.

Steps (g)-(h)

In these steps, necessary processing operations that may involve heat treatment and/or irradiation of light are conducted and the solvent is removed from the ink 6 to set the latter and produce pixels 7.

In the case of a color filter, if necessary, a protection layer and/or a transparent electroconductive film are formed as described earlier. Materials that can be used for the protection layer include resin materials of the photosetting type, the thermosetting type and the photo-thermosetting type. Alternatively, the protection layer may be made of an inorganic film prepared by evaporation or sputtering, in other words, any film that can retain the degree of transparency necessary for a color filter and withstand the transparent electroconductive film forming process and the orientation film forming process that follow. The transparent electroconductive film may be formed directly on the colored sections without using a protection layer interposed therebetween.

The surface of the substrate may be subjected to a water treatment process of contacting the surface with water after the plasma treatment process of irradiating the dry etched substrate with plasma (the above-described Step (e)) and before the process of applying the areas surrounded by the partition walls 3 (the above-described Step (f)). As a result of the water treatment process, the ink in the openings 4 of the partition walls 3 will be made to spread satisfactorily even when ink is applied only by a small amount in each area.

Water to be used in this process is preferably pure water. There are no limitations to the method of contacting the substrate 1 with water so long as the substrate 1 is completely brought into contact with water. Therefore, the substrate 1 may be dipped into water or showered with water. However, if the pattern on the substrate 1 shows a complex profile, preferably the substrate 1 is immersed into water and simultaneously irradiated with ultrasonic waves or is showered with water drops under slightly high pressure in order to make the boundary areas of the partition walls 3 and the openings 4, the corners and other minute areas satisfactorily contact water.

While the temperature of water that is brought into contact with substrate 1 is preferably high from the viewpoint of improving the surface condition of the openings 4, it is preferably between 20 and 60° C. in view of the cost and the economic effect of heating water.

As a result of this process, the quantity of the fluorine compounds existing on the surface of the substrate 1 in the areas exposed to the openings 4 of the partition walls 3 is reduced by half, and the surface coarseness of the substrate 1 becomes more remarkable than before this process.

The effect of spreading ink can be reduced if the substrate is heated and dried at a temperature higher than 100° C. after the contact of the substrate 1 and water of this process. Therefore, the heating process is preferably conducted at a temperature lower than 100° C.

Example 1

Formation of a Black Matrix

Black photoresist containing carbon black ("V-259BK Resist", available from Shinnittetsu Kagaku) was applied to a glass substrate (#1737, available from Corning) and subjected to predetermined processes of exposure to light, development and post-baking to prepare a black matrix pattern (partition walls) having a film thickness of 2 µm and oblong openings with dimensions of 75 µm×225 µm.

Preparation of Inks

Inks of R, G and B having the compositions listed below were prepared by using a thermosetting ingredient containing acrylic copolymers shown below with their content ratios.

Thermosetting ingredient:

| methyl methacrylate | 50 wt. parts |
| hydroxyethyl methacrylate | 30 wt. parts |
| N-methylol-acrylamide | 20 wt. parts |

R ink:

| C. I. Acid Orange 148 | 3.5 wt. parts |
|---|---|
| C. I. Acid Red 289 | 0.5 wt. parts |
| diethylene glycol | 30 wt. parts |
| ethylene glycol | 20 wt. parts |
| ion-exchanged water | 40 wt. parts |
| thermosetting ingredient | 6 wt. parts |

G ink:

| C. I. Acid Yellow 23 | 2 wt. parts |
|---|---|
| zinc phthalocyanine sulfonamide | 2 wt. parts |
| diethylene glycol | 30 wt. parts |
| ethylene glycol | 20 wt. parts |
| ion-exchanged water | 40 wt. parts |
| thermosetting ingredient | 6 wt. parts |

B ink:

| C. I. Direct Blue 199 | 4 wt. parts |
|---|---|
| diethylene glycol | 30 wt. parts |
| ethylene glycol | 20 wt. parts |
| ion-exchanged water | 40 wt. parts |
| thermosetting ingredient | 6 wt. parts |

Dry Etching

The glass substrate (black matrix substrate) carrying a black matrix was subjected to a dry etching process under the following conditions, using a cathode coupling-parallel plate type plasma treatment system.

| gas used: | $O_2$ |
|---|---|
| gas flow rate: | 80 sccm |
| pressure: | 8 Pa |
| RF power: | 150 W |
| treating time: | 30 sec |

Plasma Treatment

After the above dry etching process, the black matrix substrate was subjected to a plasma treatment process in the same system under the following conditions.

| gas used: | $CF_4$ |
|---|---|
| gas flow rate: | 80 sccm |
| pressure: | 50 Pa |
| RF power: | 150 W |
| treating time: | 30 sec |

Evaluation of Ink-Repellence

The plasma-treated black matrix substrate was observed for the contact angles relative to pure water, using an automatic cleansing/treatment inspection apparatus for liquid crystal glass (manufactured by Kyowa Kaimen KK). The contact angle of the black matrix surface was measured within the 5 mm wide margins around the fine pattern, while that of the glass substrate surface was measured outside the margins where no black matrix pattern existed. The measured contact angles for pure water were as follows:

| glass substrate surface: | 6° |
|---|---|
| black matrix surface: | 126° |

Evaluation of Surface Coarseness

The surface coarseness of the black matrix was observed in terms of the average coarseness (Ra) within the 5 nm wide margins as in the case of the contact angle relative to pure water by means of a contact-type surface coarseness meter "FP-20" (manufactured by Tecnor). As a result, the average coarseness (Ra) of the surface of the black matrix was found to be equal to 4.4 nm.

Preparation of Colored Sections

The above-cited R, G and B inks were applied to the plasma-treated black matrix substrate by means of an ink-jet recording system provided with an ink-jet head having a discharge capacity of 20 pl. Subsequently, the substrate was subjected to heat treatment conducted at 90° C. for 10 minutes and then at 230° C. for 30 minutes to thermally set the ink and produce colored sections (pixels). As a result of the heat setting process, a color filter was prepared. A total of seven color filter specimens were prepared by changing the volume of applied ink by every 100 pl within the range of 200 to 800 pl per each opening in order to make them show different amounts of applied ink.

Evaluation of Intermingling of Colors, Blank Areas and Flatness of the Surface of Colored Sections The prepared color filter specimens were evaluated for intermingling of colors and blank areas by observing them through an optical microscope. The specimens carrying ink applied by 300 pl per opening were also evaluated for flatness by means of the surface coarseness meter used for evaluating the surface coarseness. More specifically, the difference $(d_t - d_b)$ of the height $d_t$ of the center of each colored section from the glass surface and the height $d_b$ of the edges of the colored section from the glass surface was determined and the colored section was evaluated as flat when $-0.5$ µm$\leq (d_t - d_b) \leq 0.5$ µm, as recessed when $(d_t - d_b) < -0.5$ µm and as projecting when $(d_t - d_b) > 0.5$ µm.

As a result, the color filter specimens did not show any intermingling of colors nor blank areas and their colored sections showed a flat surface.

Example 2

Color filter specimens were prepared as in Example 1, except that "CK-S117X Resist" (available from Fuji Film Orin) was used for the black matrix containing carbon black. After the plasma treatment process, the black matrix substrate showed the following contact angles relative to pure water.

| glass substrate surface: | 5° |
|---|---|
| black matrix substrate surface: | 128° |

The average coarseness (Ra) of the surface of the black matrix was 10.3 nm. The color filter specimens of this example did not show any intermingling of colors nor blank areas, and their colored sections showed a flat surface.

Example 3

Color filter specimens were prepared as in Example 1, except that argon gas was introduced for the dry etching process. After the plasma treatment process, the black matrix substrate showed the following contact angles relative to pure water.

| | |
|---|---|
| glass substrate surface: | 8° |
| black matrix surface: | 132° |

The average coarseness (Ra) of the surface of the black matrix was 6.8 nm. The color filter specimens of this example did not show any intermingling of colors nor blank areas, and their colored sections showed a flat surface.

Example 4

Color filter specimens were prepared as in Example 1, except that a mixture of $CF_4$ gas and $O_2$ gas were introduced at respective flow rates of 64 sccm and 16 sccm for the plasma treatment process. After the plasma treatment process, the black matrix substrate showed the following contact angles relative to pure water.

| | |
|---|---|
| glass substrate surface: | 7° |
| black matrix surface: | 133° |

The average coarseness (Ra) of the surface of the black matrix was 5.2 nm. The color filter specimens of this example did not show any intermingling of colors nor blank areas, and their colored sections showed a flat surface.

Example 5

Color filter specimens were prepared as in Example 1, except that $C_5F_8$ gas was introduced for the plasma treatment process. After the plasma treatment process, the black matrix substrate showed the following contact angles relative to pure water.

| | |
|---|---|
| glass substrate surface: | 6° |
| black matrix surface: | 129° |

The average coarseness (Ra) of the surface of the black matrix was 3.8 nm. The color filter specimens of this example did not show any intermingling of colors nor blank areas, and their colored sections showed a flat surface.

Example 6

Color filter specimens were prepared as in Example 1, except that the black matrix was formed by using the same black resist as in Example 2, that the dry etching process was conducted in the same manner as in Example 3 and that the plasma treatment process was conducted in the same manner as in Example 4. After the plasma treatment process, the black matrix substrate showed the following contact angles relative to pure water.

| | |
|---|---|
| glass substrate surface: | 7° |
| black matrix surface: | 134° |

The average coarseness (Ra) of the surface of the black matrix was 18.3 nm. The color filter specimens of this example did not show any intermingling of colors L nor blank areas, and their colored sections showed a flat surface.

Example 7

Color filter specimens were prepared as in Example 1, except that the black resist of Example 1 was replaced by "CT-2000L" (available from Fuji Film Orin) that is transparent photosensitive resin containing no carbon black. After the plasma treatment process, the matrix pattern substrate showed the following contact angles relative to pure water.

| | |
|---|---|
| glass substrate surface: | 6° |
| matrix pattern surface: | 102° |

The average coarseness (Ra) of the surface of the matrix pattern was 1.5 nm.

No blank area was observed in all the color filter specimens of this example. Only a few of the specimens carrying ink applied by 600 pl or more per opening showed insignificant intermingling of colors. The colored sections were projecting only slightly, and the extent of projection was such that no problem arises therefrom in practical applications.

Comparative Example 1

Color filter specimens were prepared as in Example 1, except that neither the dry etching process nor the plasma treatment process was conducted. The obtained black matrix substrate showed the following contact angles relative to pure water.

| | |
|---|---|
| glass substrate surface: | 62° |
| black matrix surface: | 78° |

The average coarseness (Ra) of the surface of the black matrix was 2.0 nm. The color filter specimens prepared in this comparative example showed blank areas in all the colored sections thereof. Intermingling of colors was observed in the specimens carrying ink applied by 400 pl or more per opening. It was not possible to evaluate the flatness of the surface of the colored sections because of the blank areas.

Comparative Example 2

Color filter specimens were prepared as in Example 1, except that no dry etching process was conducted. After the plasma treatment process, the obtained black matrix showed the following contact angles relative to pure water.

| glass substrate surface: | 23° |
|---|---|
| black matrix surface: | 97° |

The average coarseness (Ra) of the surface of the black matrix was 3.5 nm. The color filter specimens prepared in this comparative example showed no blank areas and the surface of their colored sections was flat. Intermingling of colors was, however, observed in the specimens carrying ink applied by 600 pl or more per opening.

Table 1 summarily shows the results of the above examples and comparative examples.

Example 8

A TFT drive substrate comprising a multi-layer structure of wiring films and insulating films formed by way of a thin film process was provided. Then, an ITO film was formed by means of sputtering on the TFT drive substrate to a thickness of 40 nm as transparent electrode for each pixel (light-emitting layer) and subjected to a patterning operation by means of photolithography to produce pixels showing a predetermined profile.

Then, partition walls for filling a light-emitting layer therein were formed. Transparent photosensitive resin "CT-2000L" (available from Fuji Film Orin) was applied and subjected to predetermined processes of exposure, development and post-baking to produce a transparent matrix pattern having a film thickness of 0.4 μm and oblong openings with dimensions of 75 μm×225 μm arranged on the ITO transparent electrodes. Then, the substrate was subjected to a dry etching process using $O_2$ and a plasma treatment process using $CF_4$ under the same conditions as used in Example 1. The surface of the ITO transparent electrodes and the transparent matrix pattern, respectively, showed the following contact angles relative to pure water.

| ITO transparent electrode: | 17° |
|---|---|
| transparent matrix pattern: | 101° |

The spaces defined by the partition walls on the substrate were filled with the light-emitting layer. For the light-emitting layer, electron-transporting 2,5-bis(5-tert-butyl-2-benzoxazolyl)-thiophene (florescence peak: 450 nm, a light-emitting center-forming compound that operates as an electron-transporting blue light-emitting coloring matter, to be referred to as "BBOT" hereinafter) was dissolved in a dichloroethane solution by 30 weight percent along with a hole-transporting host compound poly-N-vinylcarbazole (molecular weight: 150,000, available from Kanto Kagaku, to be referred to as "PVK" hereinafter) so that molecules of the electron-transporting coloring matter could be dispersed in the hole-transporting host compound. The dichloroethane solution of PVK-BBOT that additionally contained Nile Red by 0.015 mol % as another light-emitting center-forming compound was filled in the spaces defined by the partition walls of the transparent resin by means of an ink-jet system and then dried to produce 200 nm thick light-emitting layers. The pixels (light-emitting layers) were isolated from each other and the solution containing said light-emitting materials did not move beyond the partition walls. Additionally, an Mg:Ag cathode was formed to a thickness of 200 nm by means of vacuum evaporation of Mg:Ag (10:1). A voltage of 18V was applied to each of the pixels of the prepared EL element to prove that the element emitted white light uniformly at a rate of 480 cd/m².

Example 9

Formation of Black Matrix

Black photoresist containing carbon black ("CK-S171 Resist", available from Fuji Film Orin) was applied to a glass substrate (#1737, available from Corning) and subjected to predetermined processes of exposure to light, development and post-baking to prepare a black matrix pattern (partition walls) having a film thickness of 2 μm and oblong openings with dimensions of 75 μm×225 μm.

Evaluation of Surface Coarseness

Prior to the formation of the black matrix, the surface coarseness of the glass substrate used for forming the black matrix thereon was observed at selected positions by means of "NanoScope IIIa AFM Dimension 3000 Stage System" (manufactured by Digital Instrument). As a result, the average coarseness (Ra) of the surface of the black matrix was found to be equal to 0.231 nm.

Dry Etching

The glass substrate (black matrix substrate) carrying a black matrix was subjected to plasma treatment under the same conditions as Example 1.

Plasma Treatment

After the above dry etching process, the black matrix substrate was subjected to a plasma treatment process under the same conditions as Example 1.

Evaluation of Ink-Repellence

The plasma-treated black matrix substrate was observed for the contact angles relative to pure water as in Example 1. The contact angles relative to pure water were as follows:

| glass substrate surface: | 6° |
|---|---|
| black matrix surface: | 126° |

Evaluation of Surface Coarseness

The surface coarseness of the black matrix was observed as in Example 1. As a result, the average coarseness (Ra) of the surface of the black matrix was found to be equal to 4.4 nm.

Also as in Example 1, the surface coarseness of the glass substrate was also evaluated after the plasma treatment to find that the average coarseness (Ra) of the surface of the glass substrate was 0.222 nm.

Evaluation of Ink Spreading Performance

After the plasma treatment, the black matrix substrate was evaluated for ink spreading performance. The above-described B ink was applied to each of the openings of the micro-pattern by 20 pl from an ink-jet head, and the black matrix was observed through an optical microscope to find that the ink droplets showed a diameter of 50 μm. The applied ink was left on the substrate for a while to find that the droplets did not wet the surrounding walls nor spread around.

Water Treatment

After the plasma treatment, the black matrix substrate was subjected to water treatment. More specifically, the black matrix substrate was immersed in an ultrasonic pure water bath under the following treatment conditions.

| | |
|---|---|
| pure water temperature: | 30° C. |
| ultrasonic wave frequency: | 40 kHz |
| treating time: | 2 min |
| drying temperature: | 90° C. |
| drying time: | 2 min. |

Evaluation of Ink-Repellence

After the water treatment, the ink-repellence of the surface of the black matrix substrate was observed again to see if it had been damaged by the water treatment by observing the contact angles relative to pure water at the positions same as those observed prior to the water treatment. The contact angles relative to pure water were as follows.

| | |
|---|---|
| glass substrate surface: | 7° |
| black matrix surface: | 124° |

Evaluation of Ink Spreading Performance

After the water treatment, the black matrix substrate was evaluated for ink spreading performance, using the same method as the one used prior to the water treatment. The black matrix substrate was observed for the diameter of ink droplets through an optical microscope to find that the ink droplets had thoroughly wetted the surrounding walls and spread fully in the respective openings so that the boundary of each droplet was hardly recognizable. The average coarseness (Ra) of the surface of the glass substrate was 0.794 nm.

Evaluation of Fluorine Compound on Glass Substrate Surface

The change in the amount of the fluorine compound on the surface of the glass substrate was observed by means of "TFS-2000" (manufactured by TOF-SIMS PHI EVANS) at three positions including (1) a position on the surface of the glass substrate before forming the black matrix, (2) a position on the area of the surface of the glass substrate outside the margins of the black matrix where no black matrix pattern was found after the plasma treatment and (3) a position on the surface of the glass substrate outside the margins of the black matrix where no black matrix pattern was found after the water treatment. The change in the fluorine compound was evaluated by way of Si+ normalization (i.e., assuming that the value of Si+ was 100). As a result, Si+ normalized values of CaF+, SrF+ and BaF+ at position (2) were 161.7, 69.0 and 102.3, respectively, while all those values at positions (1) and (3) were below 1. On the other hand, Si+ normalized value of $CF_3$+ at position (2) was 42.2 while those values at positions (1) and (3) were below 1.

The amount of the fluorine compound on the surface of the glass substrate after the water treatment was 0.052% in terms of the ratio of the Si+ normalized value for BaF+ if compared with the value before the water treatment.

Preparation of Colored Sections

The above cited R, G and B inks were applied to the water-treated black matrix substrate by means of an ink-jet recording system provided with an ink-jet head having a discharge capacity of 20 pl until each opening was made to carry 40 pl of ink. Subsequently, the substrate was subjected to heat treatment conducted at 90° C. for 10 minutes and then at 230° C. for 30 minutes to thermally set the ink and produce colored sections (pixels).

Evaluation of Blank Areas and Flatness of the Surface of Colored Sections

The prepared color filter specimens were evaluated for blank areas by observing them through an optical microscope. The specimens carrying ink applied by 40 pl per opening were also evaluated for flatness by means of the surface coarseness meter used for evaluating the surface coarseness. More specifically, the difference $(d_t-d_b)$ of the height $d_t$ of the center of each colored section from the glass surface and the height $d_b$ of the edges of the colored section from the glass surface was determined, and the colored section was evaluated as flat when $-0.5$ μm$\leq(d_t-d_b)\leq 0.5$ μm, as recessed when $(d_t-d_b)<-0.5$ in and as projecting when $(d_t-d_b)>0.5$ μm.

As a result, the color filter specimens did not show any blank areas, and their colored sections showed a flat surface.

Example 10

Color filter specimens were prepared as in Example 9, except that "V-259BKIS Resist" (available from Shinnittetsu Kagaku) was used as the black resist containing carbon black. After the water treatment process, the black matrix substrate showed the following contact angles relative to pure water.

| | |
|---|---|
| glass substrate surface: | 5° |
| black matrix surface: | 128° |

The ink spreading performance was also evaluated to find that the 20 pl of ink had satisfactorily wetted the inside of each opening and spread around. The average coarseness (Ra) of the surface of the black matrix was 10.3 nm and that of the surface of the glass substrate was 0.743 μm. The amount of the fluorine compound on the surface of the glass substrate after the water treatment was 0.042% in terms of the ratio of the Si+ normalized value for BaF+ if compared with the value before the water treatment. The color filter specimens of this example did not show any blank areas, and their colored sections showed a flat surface.

Example 11

Color filter specimens were prepared as in Example 9, except that a mixture of $CF_4$ gas and $O_2$ gas were introduced at respective flow rates of 64 sccm and 16 sccm for the plasma treatment process. After the water treatment process, the black matrix substrate showed the following contact angles relative to pure water.

| | |
|---|---|
| glass substrate surface: | 7° |
| black matrix surface: | 133 |

The average coarseness (Ra) of the surface of the glass substrate prior to the water treatment was 0.217 nm.

The ink spreading performance was also evaluated to find that the 20 pl of ink had satisfactorily wetted the inside of each opening and spread around. The average coarseness (Ra) of the surface of the black matrix was 5.2 nm and that of the surface of the glass substrate was 0.761 nm. The amount of the fluorine compound on the surface of the glass substrate after the water treatment was 0.048% in terms of the ratio of the Si+ normalized value for BaF+ if compared with the value before the water treatment. The color filter specimens of this example did not show any blank areas, and their colored sections showed a flat surface.

Example 12

Color filter specimens were prepared as in Example 9, except that the black resist of Example 9 was replaced by "CT-2000L" (available from Fuji Film Orin) that is a transparent photosensitive resin containing no carbon black. After the water treatment process, the matrix pattern substrate showed the following contact angles relative to pure water.

| | |
|---|---|
| glass substrate surface: | 6° |
| matrix pattern surface: | 62° |

The ink spreading performance was also evaluated to find that the 20 pl of ink had satisfactorily wetted the inside of each opening and spread around. The average coarseness (Ra) of the surface of the matrix pattern was 1.5 nm and that of the surface of the glass substrate was 0.787 nm. The amount of the fluorine compound on the surface of the glass substrate after the water treatment was 0.045% in terms of the ratio of the Si+ normalized value for BaF+ if compared with the value before the water treatment.

The color filter specimens of this example did not show any blank areas, and their colored sections were projecting only slightly; the boundaries of the colored sections and the matrix pattern showed a slightly low density only to such an extent that no problem arises therefrom in practical applications.

Example 13

Color filter specimens were prepared as in Example 9, except that the temperature of pure water used for the water treatment was held to 50° C., and the treating time was made to be equal to 30 sec. After the water treatment process, the black matrix substrate showed the following contact angles relative to pure water.

| | |
|---|---|
| glass substrate surface: | 8° |
| black matrix surface: | 124° |

The ink spreading performance was also evaluated to find that the 20 pl of ink had satisfactorily wetted the inside of each opening and spread around. The average coarseness (Ra) of the surface of the black matrix was 10.5 nm and that of the surface of the glass substrate was 0.753 nm. The amount of the fluorine compound on the surface of the glass substrate after the water treatment was 0.041% in terms of the ratio of the Si+ normalized value for BaF+ if compared with the value before the water treatment. The specimens of color filter of this example did not show any blank areas and their colored sections showed a flat surface.

Example 14

Color filter specimens were prepared as in Example 9, except that the plasma-treated substrate was subjected to water treatment using a pure water shower cleaning system. The showering time was 30 sec, and the pure water temperature was 35° C. The drying conditions of Example 9 were also used here. After the water treatment process, the black matrix substrate showed the following contact angles relative to pure water.

| | |
|---|---|
| glass substrate surface: | 7° |
| black matrix surface: | 126° |

The ink spreading performance was also evaluated to find that the 20 pl of ink had satisfactorily wetted the inside of each opening and spread around. The average coarseness (Ra) of the surface of the black matrix was 12.3 nm and that of the surface of the glass substrate was 0.771 nm. The amount of the fluorine compound on the surface of the glass substrate after the water treatment was 0.045% in terms of the ratio of the Si+ normalized value for BaF+ if compared with the value before the water treatment. The color filter specimens of this example did not show any blank areas, and their colored sections showed a flat surface.

Example 15

Color filter specimens were prepared as in Example 9, except that the plasma-treated substrate was subjected to water treatment using a high pressure spray cleaning system. Pure water was used for the high pressure spraying. The spraying pressure was selected to be $6.86 \times 10^6$ N/m$^2$ (70 kgf/cm$^2$). The drying conditions of Example 9 were also used here. After the water treatment process, the black matrix substrate showed the following contact angles relative to pure water.

| | |
|---|---|
| glass substrate surface: | 5° |
| black matrix surface: | 124° |

The ink spreading performance was also evaluated to find that the 20 pl of ink had satisfactorily wetted the inside of each opening and spread around. The average coarseness (Ra) of the surface of the black matrix was 9.9 nm and that of the surface of the glass substrate was 0.748 nm. The amount of the fluorine compound on the surface of the glass substrate after the water treatment was 0.044% in terms of the ratio of the Si+ normalized value for BaF+ if compared with the value before the water treatment. The color filter specimens of this example did not show any blank areas, and their colored sections showed a flat surface.

Example 16

A TFT drive substrate comprising a multi-layer structure of wiring films and insulating films formed by way of a thin film process was provided. Then, an ITO film was formed by means of sputtering on the TFT drive substrate to a thickness of 40 nm as transparent electrode for each pixel (light-emitting layer) and subjected to a patterning operation by means of photolithography to produce pixels showing a predetermined profile.

Then, partition walls for filling a light-emitting layer therein were formed. Transparent photosensitive resin "CT-2000L" (available from Fuji Film Orin) was applied and subjected to predetermined processes of exposure, development and post-baking to produce a transparent matrix pattern having a film thickness of 0.4 μm and oblong openings with dimensions of 75 μm×225 μm arranged on the ITO transparent electrodes. Then, the substrate was subjected to a dry etching process using $O_2$ and a plasma treatment process using $CF_4$ under the conditions same as those used in Example 1. As a result of evaluating the surface coarseness of the ITO transparent electrodes as in the case of evaluating the surface coarseness of the glass substrate in Example 1, the average coarseness (Ra) was found to be equal to 31.5 nm. Then, the substrate was subjected to a water treatment process. The surface of the ITO transparent electrodes and the transparent matrix pattern, respectively, showed the following contact angles relative to pure water after the water treatment process.

| ITO transparent electrode: | 17° |
|---|---|
| transparent matrix pattern: | 61° |

When 20 pl of ink was applied to the ITO transparent electrode in order to evaluate the ink spreading performance of the ITO transparent electrode, it was found that the ink had satisfactorily wetted the ITO electrode and spread around. The average coarseness (Ra) of the surface of the matrix pattern was 2.35 nm and that of the surface of the ITO transparent electrodes was 32.1 nm. The amount of the fluorine compound on the surface of the ITO transparent electrodes after the water treatment was 0.041% in terms of the ratio of the Si+ normalized value for $CF_3+$ if compared with the value before the water treatment.

Ink was applied to the inside of the openings defined by the partition walls by means of an ink-jet recording system. For the ink, electron-transporting 2,5-bis(5-tert-butyl-2-benzoxazolyl)-thiophene (florescence peak: 450 nm, a light-emitting center-forming compound that operates as an electron-transporting blue light-emitting coloring matter, to be referred to as "BBOT" hereinafter) was dissolved in a dichloroethane solution by 30 weight percent along with a hole-transporting host compound that was poly-N-vinylcarbazole (molecular weight: 150,000, available from Kanto Kagaku), to be referred to as "PVK" hereinafter) so that molecules of the electron-transporting coloring matter could be dispersed in the hole-transporting host compound. The dichloroethane solution of PVK-BBOT that additionally contained Nile Red by 0.015 mol % as another dissolved light-emitting center-forming compound was filled in the spaces defined by the partition walls of the transparent resin by means of an ink-jet system and then dried to produce 200 nm thick light-emitting layers. The pixels (light-emitting layers) were isolated from each other, and the solution containing said light-emitting materials did not move beyond the partition walls.

Additionally, an Mg:Ag cathode was formed to a thickness of 200 nm by means of vacuum evaporation of Mg:Ag (10:1). A voltage of 18V was applied to each of the pixels of the prepared EL element to prove that the element emitted white light uniformly at a rate of 480 cd/m$^2$.

As described above in detail, according to the invention, there is provided a method of manufacturing an optical element such as a color filter or an EL element comprising pixels that are free from the problems of intermingling of colors, blank areas and uneven density in the colored sections in a simple process at low cost so that the method can provide reliable optical elements at a high manufacturing yield. Therefore, it is now possible to provide a liquid crystal element adapted to display excellent color images and comprising optical filters produced by the manufacturing method according to the invention at low cost.

TABLE 1

| | Ex. 1 | Ex. 2 | Ex. 3 | Ex. 4 | Ex. 5 | Ex. 6 | Ex. 7 | COMP. Ex. 1 | COMP. Ex. 2 |
|---|---|---|---|---|---|---|---|---|---|
| BLACK MATRIX | V-259BK | CK-S171X | V-259BK | V-259BK | V-259BK | CK-S171X | CT-2000L | V-259BK | V-259BK |
| DRY ETCHING | | | | | | | | | |
| USED GAS | $O_2$ | $O_2$ | Ar | $O_2$ | $O_2$ | Ar | $O_2$ | untreated | untreated |
| FLOW RATE (sccm) | 80 | 80 | 80 | 80 | 80 | 80 | 80 | | |
| PRESSURE (Pa) | 8 | 8 | 8 | 8 | 8 | 8 | 8 | | |
| RF Power (W) | 150 | 150 | 150 | 150 | 150 | 150 | 150 | | |
| PLASMA TREATMENT | | | | | | | | | |
| USED GAS | $CF_4$ | $CF_4$ | $CF_4$ | $CF_4/O_2$ | $C_5F_8$ | $CF_4/O_2$ | $CF_4$ | untreated | $CF_4$ |
| FLOW RATE (sccm) | 80 | 80 | 80 | 64/16 | 80 | 64/16 | 80 | | 80 |
| PRESSURE (Pa) | 50 | 50 | 50 | 50 | 50 | 50 | 50 | | 50 |
| RF Power (W) | 150 | 150 | 150 | 150 | 150 | 150 | 150 | | 150 |
| CONTACT ANGEL FOR PURE WATER | | | | | | | | | |
| GLASS SUBSTRATE | 6° | 5° | 8° | 7° | 6° | 7° | 6° | 62° | 23° |
| BLACK MATRIX | 126° | 128° | 132° | 133° | 129° | 134° | 102° | 78° | 97° |
| SURFACE COARSENESS OF BLACK MATRIX AVERAGE COARSENESS Ra (nm) | 4.4 | 10.3 | 6.8 | 5.2 | 3.8 | 18.3 | 1.5 | 2 | 3.5 |
| COLORED SECTIONS | | | | | | | | | |
| COLOR MIXING | nil | nil | nil | nil | nil | nil | observable at >600 pL | observed at >400 pL | observed at >400 pL |
| BLANK AREAS | nil | nil | nil | nil | nil | nil | nil | observed | nil |
| SURFACE FLATNESS | flat | flat | flat | flat | flat | flat | convex | not valued | flat |

What is claimed is:

1. A method of manufacturing an optical element comprising at least a plurality of pixels formed on a substrate and partition walls arranged respectively between adjacent pixels, said method comprising the steps of:

forming partition walls from a resin composition containing carbon black on a substrate;

performing a dry etching process by irradiating the substrate carrying said partition walls formed thereon with plasma in an atmosphere containing a gas selected from the group consisting of oxygen, argon, and helium;

performing a plasma treatment process by irradiating the substrate subjected to said dry etching process with plasma in an atmosphere formed by introducing a mixture of (a) a halogen gas selected from the group consisting of $CF_4$, $SF_6$, $CHF_3$, $C_2F_6$, $C_3F_8$, and $C_5F_8$ and (b) $O_2$ gas, wherein the amount of $O_2$ gas in the mixture is not greater than 30% such that each partition wall after said plasma treatment process shows a surface having a contact angle relative to pure water of not smaller than 110° and a surface coarseness represented by an arithmetic mean deviation (Ra) of between 3 nm and 50 nm which is greater than before said dry etching process and such that the substrate after said plasma treatment process shows a surface having a contact angle relative to pure water, of not greater than 20°;

forming pixels by applying ink containing at least a setting ingredient, water, and an organic solvent to the areas surrounded by the partition walls by means of an ink-jet system; and setting the applied ink.

2. The method of manufacturing an optical element according to claim 1, wherein said method is adapted to manufacture a color filter where said substrate is a transparent substrate and said partition walls are provided by a black matrix.

3. The method of manufacturing an optical element according to claim 1, wherein after said plasma treatment process, the plasma-treated substrate is subjected to a water treatment process.

* * * * *

UNITED STATES PATENT AND TRADEMARK OFFICE
CERTIFICATE OF CORRECTION

| | | |
|---|---|---|
| PATENT NO. | : 7,354,520 B2 | |
| APPLICATION NO. | : 10/633523 | |
| DATED | : April 8, 2008 | |
| INVENTOR(S) | : Takeshi Okada et al. | |

It is certified that error appears in the above-identified patent and that said Letters Patent is hereby corrected as shown below:

<u>ON THE TITLE PAGE, AT ITEM (30), FOREIGN APPLICATION PRIORITY DATA</u>
"Oct. 22" should read --Oct. 12--.

<u>ON THE TITLE PAGE, AT ITEM (57), ABSTRACT</u>
Line 12, "surrounded" should read --surrounded by the--.

<u>COLUMN 6</u>
Line 14, "surrounding" should read --surrounded--.

<u>COLUMN 14</u>
Line 45, "contains" should read --contain--.

<u>COLUMN 20</u>
Line 9, "L" should be deleted.

<u>COLUMN 22</u>
Line 27, "to plasma treatment" should read --to a dry etching process--.

<u>COLUMN 24</u>
Line 16, "in" should read --µm--.
Line 58, "133" should read --133°--.

UNITED STATES PATENT AND TRADEMARK OFFICE
CERTIFICATE OF CORRECTION

PATENT NO. : 7,354,520 B2
APPLICATION NO. : 10/633523
DATED : April 8, 2008
INVENTOR(S) : Takeshi Okada et al.

It is certified that error appears in the above-identified patent and that said Letters Patent is hereby corrected as shown below:

COLUMN 27
Line 53, "ANGEL" should read --ANGLE--.

COLUMN 28
Line 8, "Kagaku)," should read --Kagaku,--.

Signed and Sealed this

Second Day of December, 2008

JON W. DUDAS
*Director of the United States Patent and Trademark Office*